United States Patent
Chen et al.

(10) Patent No.: US 8,593,598 B2
(45) Date of Patent: Nov. 26, 2013

(54) CONTROLLING REFLECTION IN LCD DEVICES

(75) Inventors: Cheng Chen, Cupertino, CA (US); John Z. Zhong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 220 days.

(21) Appl. No.: 13/103,757

(22) Filed: May 9, 2011

(65) Prior Publication Data

US 2012/0287378 A1 Nov. 15, 2012

(51) Int. Cl.
*G02F 1/1335* (2006.01)
(52) U.S. Cl.
USPC ............................................. 349/114; 349/96
(58) Field of Classification Search
USPC .................................................. 349/114, 96
See application file for complete search history.

(56) References Cited

U.S. PATENT DOCUMENTS

2003/0201960 A1  10/2003  Fujieda
2007/0040979 A1*  2/2007  Shiota et al. .................. 349/141
2007/0279554 A1  12/2007  Kowarz et al.
2012/0120328 A1*  5/2012  Lu .................................... 349/1

FOREIGN PATENT DOCUMENTS

EP          1168050 B1       1/2005

* cited by examiner

*Primary Examiner* — Nathanael R Briggs
(74) *Attorney, Agent, or Firm* — Fletcher Yoder PC

(57) ABSTRACT

Systems and methods are provided for controlling the light reflected from a display panel. In one embodiment, a prism mirror and a diffuse reflector are positioned between the bottom polarizer and the liquid crystal layer of a pixel to control the polarization of reflected light transmitted through the display panel. The diffuse reflector diffuses light towards the prism mirror, and the prism mirror affects the polarization of the light. When the pixel is on, the liquid crystals of the liquid crystal layer may shift the polarization of the reflected light such that it can be transmitted through the top polarizer. When the pixel is off, the liquid crystals may not substantially shift the polarization of the reflected light, and the reflected light may be polarized to be absorbed by the top polarizer. Accordingly, reflected light is substantially transmitted through the pixel when the pixel is on, and substantially absorbed by the top polarizer when the pixel is off.

21 Claims, 9 Drawing Sheets

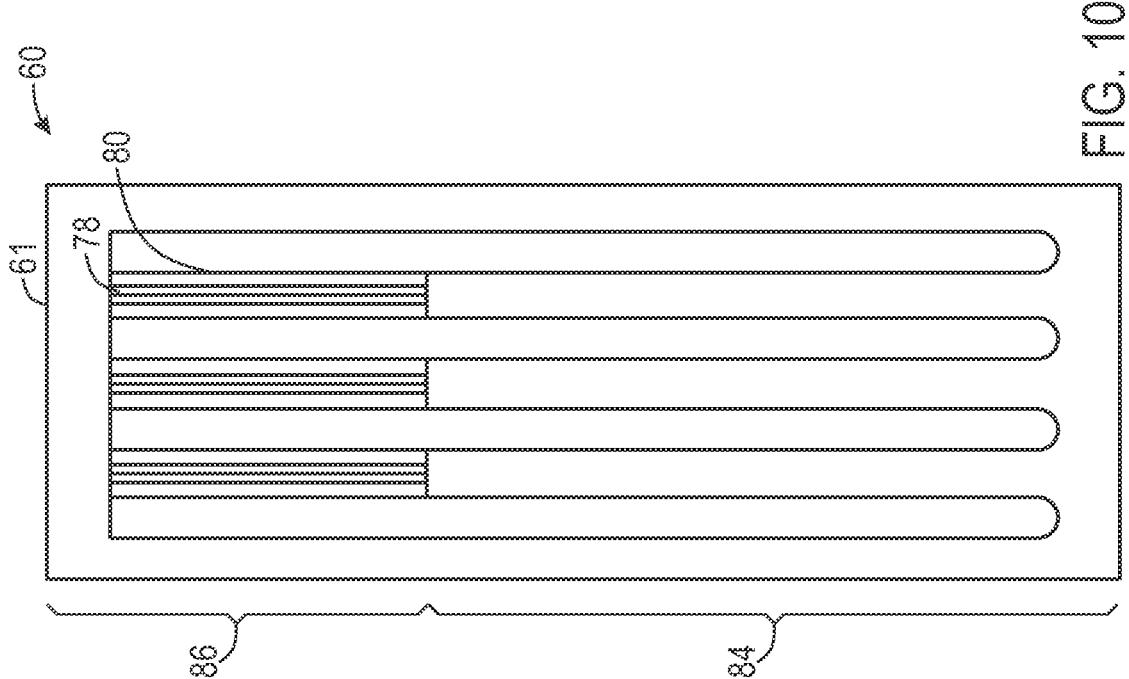
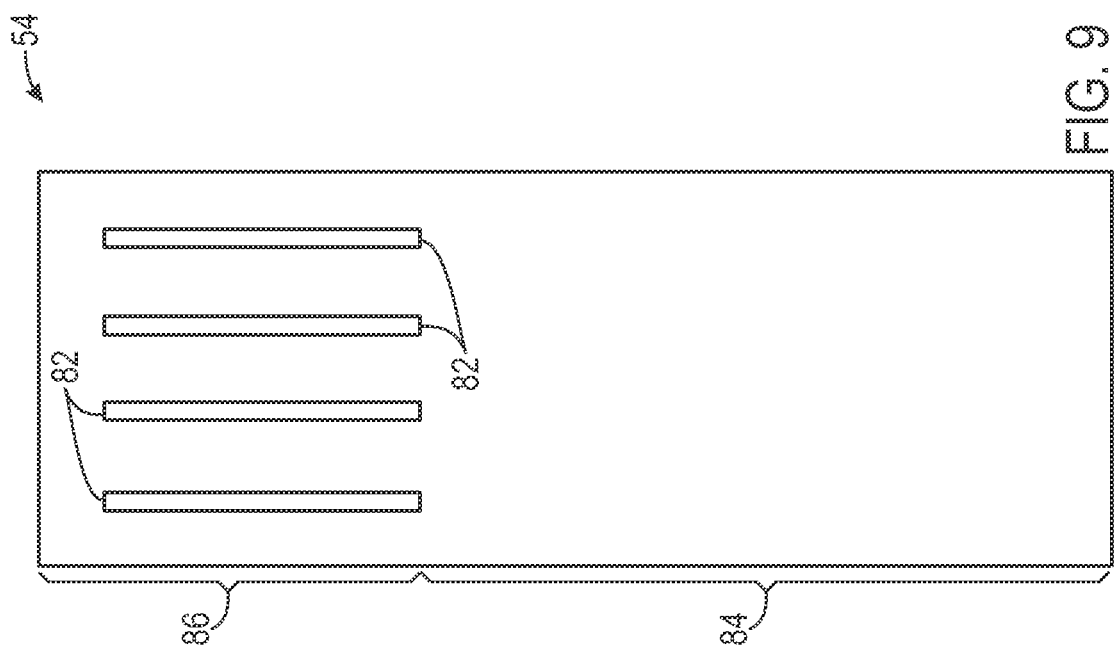

CONTROLLING REFLECTION IN LCD DEVICES

BACKGROUND

The present disclosure relates generally to display devices, and more particularly, to techniques for controlling reflections on display devices.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Liquid crystal displays (LCDs) are commonly used as screens or displays for a wide variety of electronic devices, including such consumer electronics as televisions, computers, and handheld devices (e.g., cellular telephones, audio and video players, gaming systems, and so forth). Such LCD devices typically provide a flat display in a relatively thin package that is suitable for use in a variety of electronic goods. In addition, such LCD devices typically use less power than comparable display technologies, making them suitable for use in battery powered devices or in other contexts were it is desirable to minimize power usage.

LCD devices typically include multiple layers, including a backlight, an LCD panel having a pixel matrix configured to selectively modulate the amount and color of light transmitted from the backlight, and a color filter layer which enables specific colors of light to be emitted (e.g., red, green, and blue). One technique for reducing the power usage of the LCD device includes implementing a reflective layer behind the liquid crystal panel of the LCD device, such that external light (i.e., ambient light, such as from sunlight, lamplight, etc.) may be reflected out from the display screen of the LCD device, thereby contributing to the illumination of the screen. However, while such techniques may decrease power consumption of the LCD device, reflections of external light may sometimes contribute to undesirable display effects. For instance, external light may reflect evenly across the display surface and from both black and white pixels, thereby decreasing the contrast ratio of the display, especially in brightly lit environments.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to techniques for controlling the light reflected from the display surface of a display device. Typically, in a display device, external light can pass through the layers of the display panel (e.g., the top substrate, polarizer layer, liquid crystal layer, etc.) and be reflected out of the display surface from a reflective or transflective layer in the display device. Due to the configuration of some conventional displays, such as in-plane switching (IPS) or fringe field switching (FFS) displays, such reflected light may exit the display surface of the display whether a pixel is on (i.e., activated or in a white state) or off (i.e., deactivated or in a black state). Such reflected light may decrease the contrast ratio of the displayed images, contribute to glare on the display surface, and/or result in any other undesirable visual effect on the display surface.

In one embodiment, a display device includes transflective layer having a diffuse reflector and a prism mirror configured to control the polarization of light propagating within each pixel of the display, thereby controlling the light reflected from the pixel. The transflective layer may be disposed behind a liquid crystal layer of each pixel and may be configured to reflect external light and/or transmit light out towards the display surface. As external light impinges a top surface (i.e., the display surface) of the display device, the external light may be polarized by a top polarizer in a first polarization. The diffuse reflector diffuses and/or reflects this light towards the prism mirror. The prism mirror may be configured such that light impinging the mirror may be substantially polarized in a second polarization.

In some embodiments, when the pixel is on, a voltage may be applied to the pixels to generate an electromagnetic field in the liquid crystal layer, such that the liquid crystals of the liquid crystal layer are aligned or shaped to shift the polarization of the reflected light so that it is again polarized in the first polarization. As the top polarizer also has the first polarization, the reflected light may pass through the top polarizer and out of the pixel. When the pixel is off, the liquid crystals may not change the polarization of the reflected light, and the reflected light, which is polarized in the second polarization, may be absorbed by the top polarizer. As such, reflected light is substantially transmitted through the pixel and out of the display surface while the pixel is on, and substantially absorbed by the top polarizer and not transmitted through the pixel while the pixel is off. Therefore, in some embodiments, the transflective layer may cause external light to be reflected while the pixel is on, and absorbed while the pixel is off.

BRIEF DESCRIPTION OF THE DRAWINGS

Various aspects of this disclosure may be better understood upon reading the following detailed description and upon reference to the drawings in which:

FIG. 9 is an aerial view of a color filter layer of the pixel illustrated in FIG. 8 in accordance with aspects of the present disclosure;

FIG. 10 is an aerial view of the transflective layer of the pixel illustrated in FIG. 8 in accordance with aspects of the present disclosure;

DETAILED DESCRIPTION OF SPECIFIC EMBODIMENTS

Figure 1:
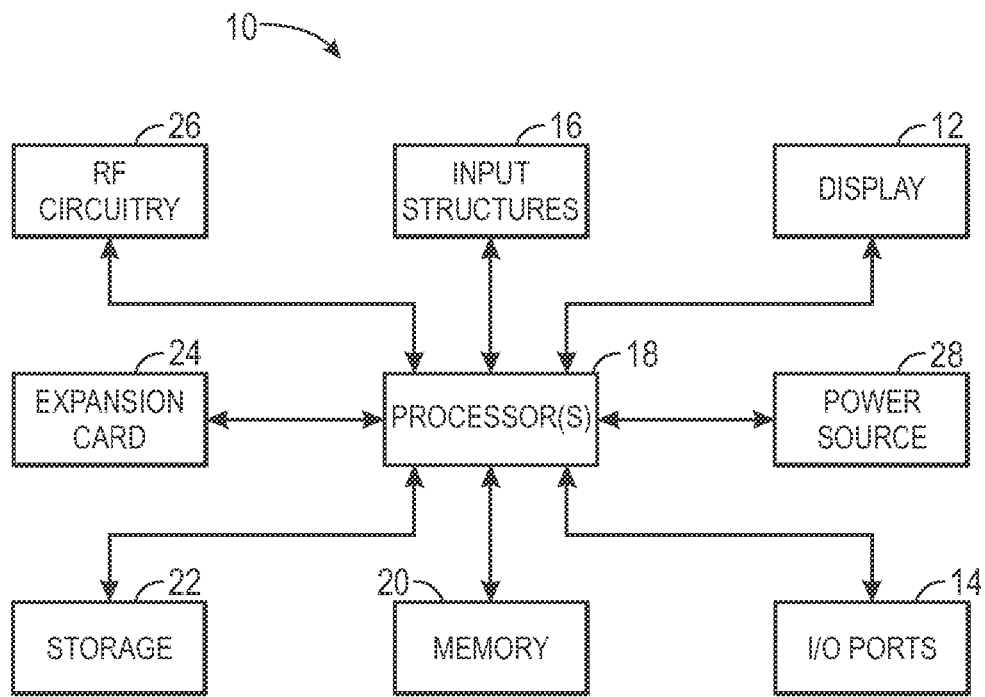
FIG. 1 is a block diagram of an electronic device, in accordance with aspects of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

One or more embodiments are directed towards controlling the light reflected from a display device. Some display devices may include a reflective layer or a transflective layer to increase the illumination of the display screen without using substantially more power. More specifically, a reflective layer including a substrate of light-reflective materials may be disposed behind the liquid crystal layer of the display device, such that external light which impinges the display surface may be reflected from the reflective layer. The light reflected from the reflective layer may pass through the display surface in addition to the light generated by and emitted from the display device (e.g., from an liquid crystal display (LCD) backlight or from an organic light emitting diode (OLED) device). Therefore, the light reflected from the reflective layer may increase the total illumination from each pixel without consuming more power to increase light emitted by an internal light source. A transflective layer may refer to a layer configured to reflect and/or transmit light for a pixel matrix of the display device. For example, a portion of the transflective layer corresponding to each pixel may have a transmissive portion configured to transmit backlight out of the display surface and a reflective portion configured to reflect external light out of the display surface.

Typically, in a display device, external light can pass through the layers of the display panel (e.g., the top substrate, polarizer layer, liquid crystal layer, etc.) and be reflected out of the display surface from the reflective layer in the display device. While such configurations may generally increase illumination from each pixel without increasing power consumption, reflections from the reflective layer may also decrease the viewability of images displayed on the display screen. For example, some displays, such as conventional in-plane switching (IPS) or fringe field switching (FFS) displays, may reflect light through the display surface of the display whether a pixel is in an on state (i.e., activated or in a white state) or in an off state (i.e., deactivated or in a black state). Such reflected light, particularly reflected light from a pixel in a black state, may decrease the contrast ratio of the displayed images, contribute to glare on the display surface, and/or result in any other undesirable visual effect on the display surface.

In one embodiment, a display device includes transflective layer having a prism mirror and a diffuse reflector configured to control the light reflected through the top surface of the display. The transflective layer may be disposed behind a liquid crystal layer of a pixel in the display device and may be configured to reflect external light and/or transmit backlight out towards the display surface. Moreover, in some embodiments, the transflective layer may affect the polarization of external light to substantially control the transmittance or absorption of light reflected from the display surface depending on whether a pixel is on or off. As will be discussed, in some embodiments, the transflective layer may cause external light to be reflected when the pixel is on, and absorbed with the pixel is off, thereby improving the contrast between on and off pixels, particularly in bright ambient environments.

As may be appreciated, electronic devices may include various internal and/or external components which contribute to the function of the device. For instance, FIG. 1 is a block diagram illustrating components that may be present in one such electronic device 10. Those of ordinary skill in the art will appreciate that the various functional blocks shown in FIG. 1 may include hardware elements (including circuitry), software elements (including computer code stored on a computer-readable medium, such as a hard drive or system memory), or a combination of both hardware and software elements. FIG. 1 is only one example of a particular implementation and is merely intended to illustrate the types of components that may be present in the electronic device 10. For example, in the presently illustrated embodiment, these components may include a display 12, input/output (I/O) ports 14, input structures 16, one or more processors 18, one or more memory devices 20, non-volatile storage 22, expansion card(s) 24, networking device 26, and power source 28.

The display 12 may be used to display various images generated by the electronic device 10. The display 12 may be any suitable display, such as a liquid crystal display (LCD) or an organic light-emitting diode (OLED) display. Additionally, in certain embodiments of the electronic device 10, the display 12 may be provided in conjunction with a touch-sensitive element, such as a touch-screen, that may be used as part of the control interface for the device 10. The display 12 may also include a matrix of pixels and circuitry for modulating the transmittance of light through each pixel to display an image.

Figure 2:
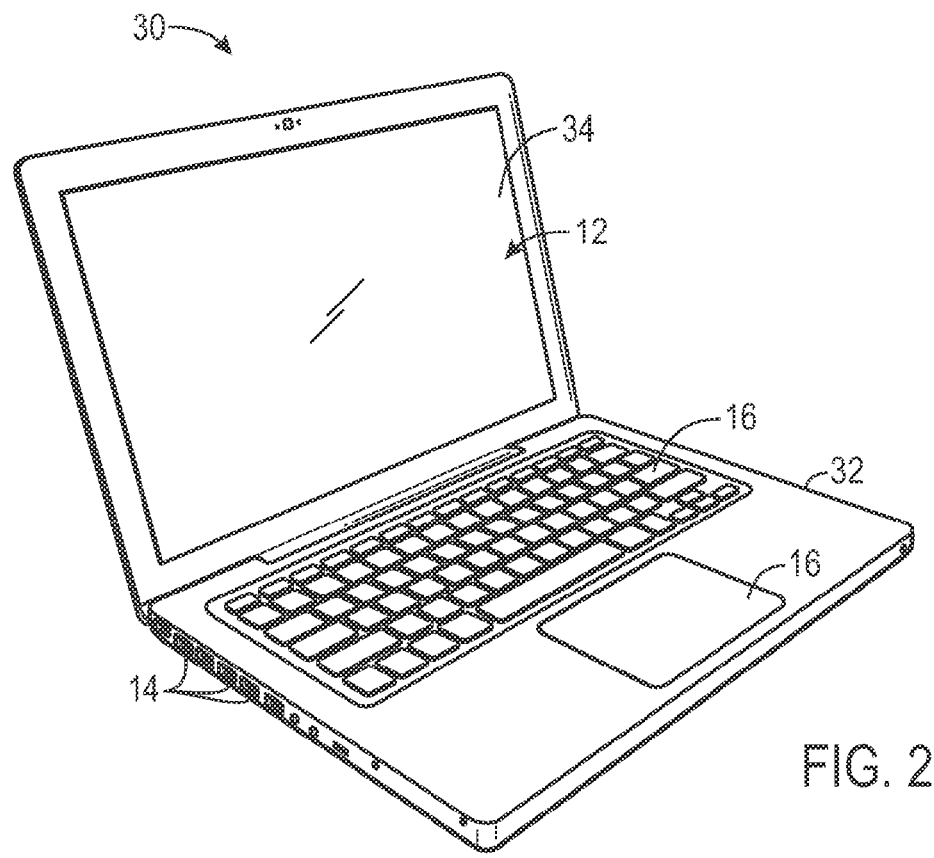
FIG. 2 is a perspective view of a computer in accordance with aspects of the present disclosure.

The electronic device 10 may take the form of a computer system or some other type of electronic device. Such computers may include computers that are generally portable (such as laptop, notebook, tablet, and handheld computers), as well as computers that are generally used in one place (such as conventional desktop computers, workstations and/or servers). In certain embodiments, electronic device 10 in the form of a computer may include a model of a MacBook®, MacBook® Pro, MacBook Air®, iMac®, Mac® mini, or Mac Pro® available from Apple Inc. of Cupertino, Calif. By way of example, an electronic device 10 in the form of a laptop computer 30 is illustrated in FIG. 2 in accordance with one embodiment. The depicted computer 30 includes a housing 32, a display 12 (e.g., in the form of an LCD 34 or some other suitable display), I/O ports 14, and input structures 16.

The display 12 may be integrated with the computer 30 (e.g., such as the display of the depicted laptop computer) or may be a standalone display that interfaces with the computer 30 using one of the I/O ports 14, such as via a DisplayPort, Digital Visual Interface (DVI), High-Definition Multimedia Interface (HDMI), or analog (D-sub) interface. For instance, in certain embodiments, such a standalone display 12 may be a model of an Apple Cinema Display®, available from Apple Inc.

Figure 3:
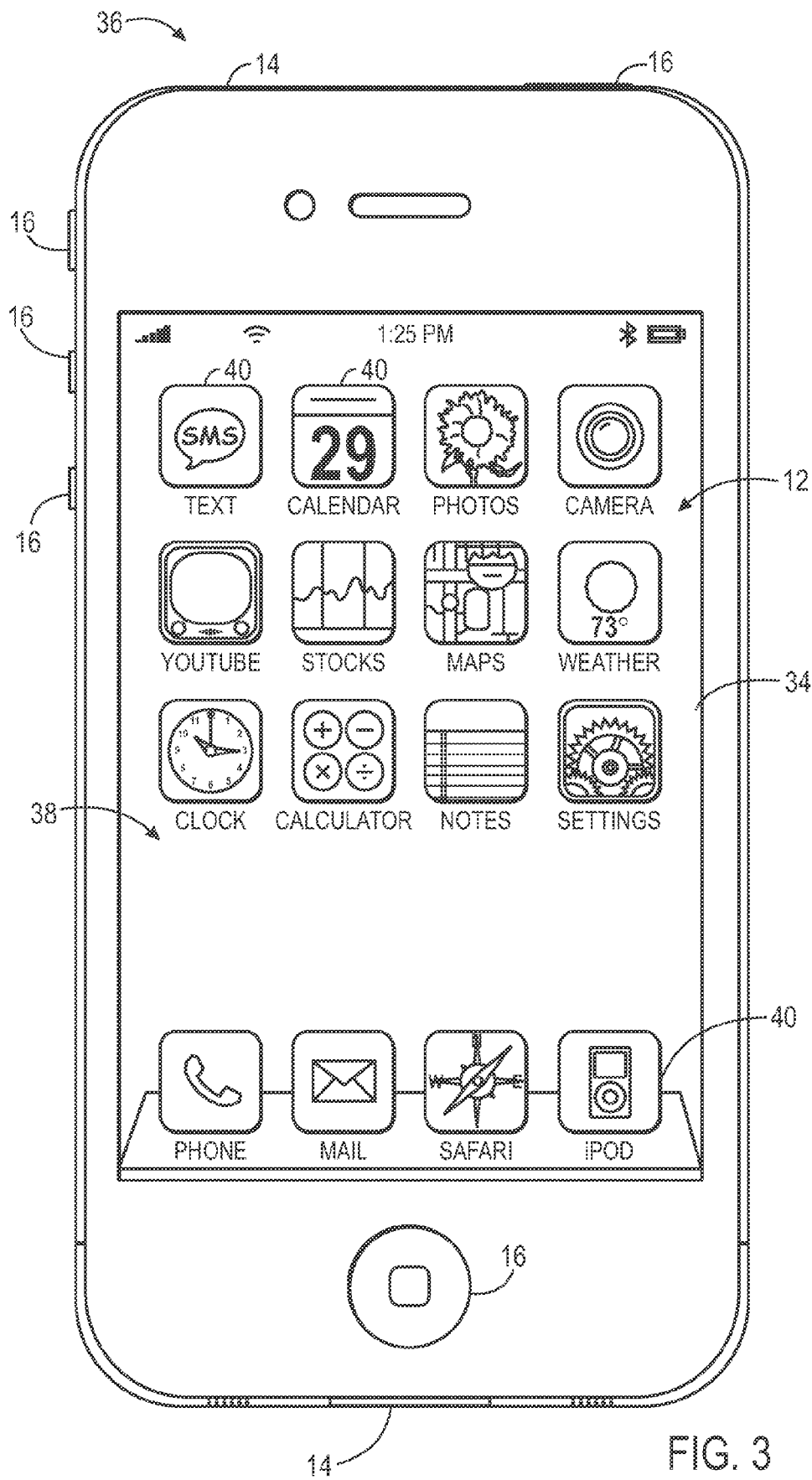
FIG. 3 is a perspective view of a handheld electronic device in accordance with aspects of the present disclosure.

Although an electronic device 10 is generally depicted in the context of a computer in FIG. 2, an electronic device 10 may also take the form of other types of electronic devices. In some embodiments, various electronic devices 10 may include mobile telephones, media players, personal data organizers, handheld game platforms, cameras, and combinations of such devices. For instance, as generally depicted in FIG. 3, the device 10 may be provided in the form of handheld electronic device 36 that includes various functionalities (such as the ability to take pictures, make telephone calls, access the Internet, communicate via email, record audio and video, listen to music, play games, and connect to wireless networks). By way of further example, handheld device 36 may be a model of an iPod®, iPod® Touch, or iPhone® available from Apple Inc. In the depicted embodiment, the handheld device 32 includes the display 12, which may be in the form of an LCD 34. The LCD 34 may display various images generated by the handheld device 32, such as a graphical user interface (GUI) 38 having one or more icons 40. A user may perform various functions using touch-screen technology by touching a top surface of a touch-sensitive LCD 34 and accessing the GUI 38.

In another embodiment, the electronic device 10 may also be provided in the form of a portable multi-function tablet computing device (not illustrated). In certain embodiments, the tablet computing device may provide the functionality of two or more of a media player, a web browser, a cellular phone, a gaming platform, a personal data organizer, and so forth. By way of example only, the tablet computing device may be a model of an iPad® tablet computer, available from Apple Inc.

With the foregoing discussion in mind, it may be appreciated that an electronic device 10 in either the form of a computer 30 (FIG. 2) or a handheld device 36 (FIG. 3) may be provided with a display device 10 in the form of an LCD 34. As discussed above, an LCD 34 may be utilized for displaying respective operating system and/or application graphical user interfaces running on the electronic device 10 and/or for displaying various data files, including textual, image, video data, or any other type of visual output data that may be associated with the operation of the electronic device 10.

Figure 4:
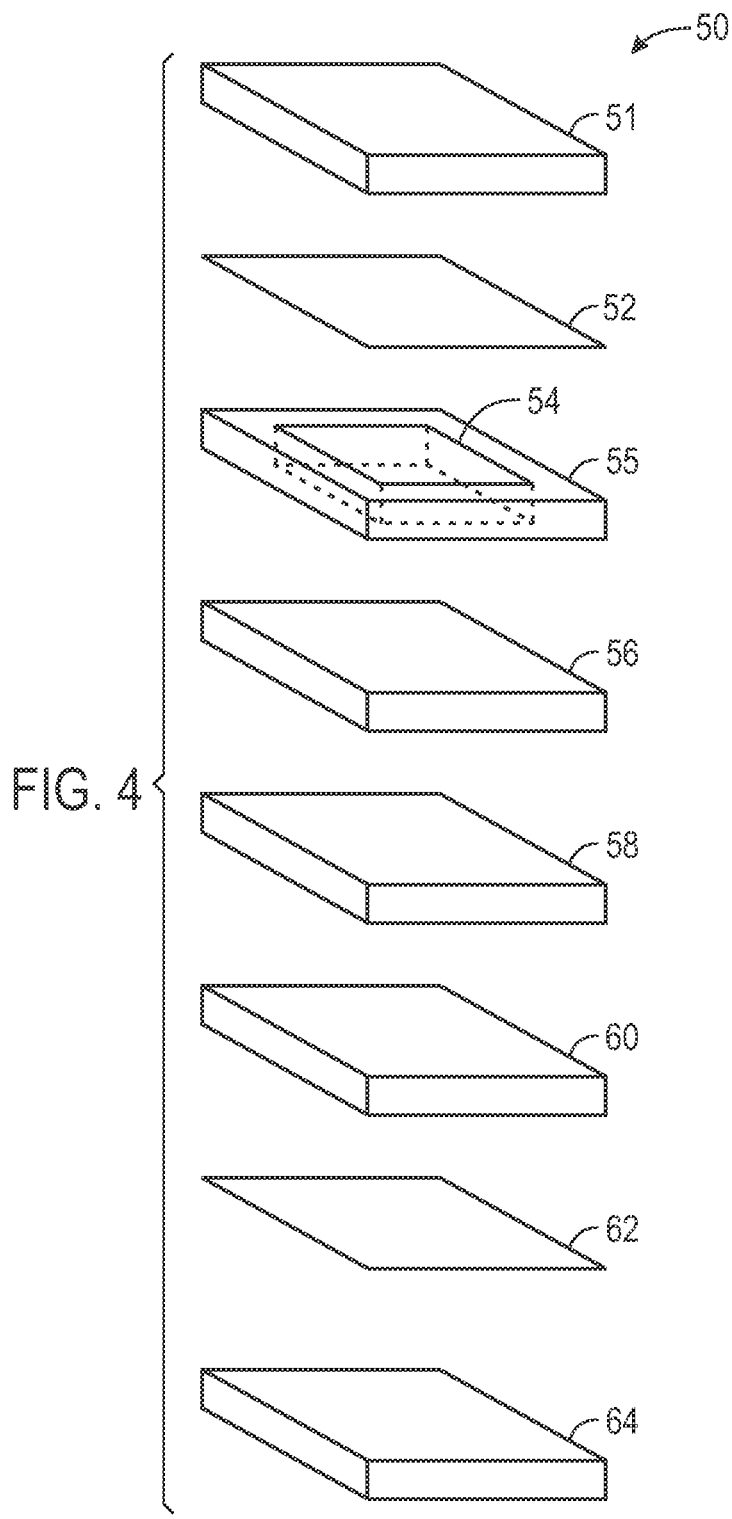
FIG. 4 is an exploded view of a pixel in the display device illustrated in FIG. 1, in accordance with aspects of the present disclosure.

With the foregoing in mind, and referring once again to the figures, FIG. 4 depicts an exploded view showing different layers that may be implemented in a unit pixel of an LCD 34. The pixel, referred to herein by the reference number 50, includes a top polarizing layer 52 and a bottom polarizing layer 62 each configured to polarize light emitted by a light source 64, which may be provided as a backlight assembly unit or a light-reflective surface. The top polarizing layer (top polarizer) 52 may also be suitable for polarizing external light and/or absorbing reflected light, as will be further discussed. In embodiments where the light source 64 is a backlight assembly unit, any type of suitable lighting device, such as cold cathode fluorescent lamps (CCFLs), hot cathode fluorescent lamps (HCFLs), and/or light emitting diodes (LEDs), may be utilize to provide lighting.

As shown in the present embodiment, a transflective layer 60 is disposed above the bottom polarizing layer 62. As will be discussed in further detail, the transflective layer 60 may include a substrate having transmissive materials, reflective materials, holes, and/or mirrors configured to control the transmission and/or reflection of light in each pixel 50 of the display 12.

A thin film transistor (TFT) layer 58 is depicted as being disposed above the transflective layer 60. For simplicity of illustration, the TFT layer 58 is depicted as a generalized structure in FIG. 4. In practice, the TFT layer 58 may itself include various conductive, non-conductive, and semiconductive layers and structures which generally form the electrical devices and pathways which drive operation of the unit pixel 50. For example, in an embodiment in which the pixel 50 is part of an FFS LCD panel, the TFT layer 58 may include the respective data lines (also referred to as "source lines"), scanning lines (also referred to as "gate lines"), pixel electrodes, and common electrodes (as well as other conductive traces and structures) of the pixel 50. Such conductive structures may, in light-transmissive portions of the pixel 50, be formed using transparent conductive materials, such as indium tin oxide (ITO) or indium zinc oxide (IZO), for example. The TFT layer 58 may further include insulating layers (such as a gate insulating film) formed from suitable transparent materials (such as silicon oxide) and semiconductive layers formed from suitable semiconductor materials (such as amorphous silicon). In general, the respective conductive structures and traces, insulating structures, and semiconductor structures may be suitably disposed to form the respective pixel electrodes and common electrodes, a TFT, and the respective data and scanning lines used to operate (e.g., activate or deactivate) the unit pixel 50.

The liquid crystal layer 56 may be disposed over the TFT layer 58 may include liquid crystal molecules suspended in a fluid or embedded in polymer networks. The liquid crystal molecules may be oriented or aligned with respect to an electrical field generated by the TFT layer 58. In practice, the orientation of the liquid crystal molecules in the liquid crystal layer 56 determines the amount of light (e.g., provided by the light source 64) that is transmitted through the pixel 50. For example, applying a voltage to the TFT layer 58 of the pixel may generate an electric field in the liquid crystal layer 56, such that the liquid crystal molecules in the liquid crystal layer 56 may be aligned to affect the polarization of light propagating through the liquid crystal layer 56. Based on the polarization of the light passing out from the liquid crystal layer 56, the light may be absorbed by the top polarizer 52 or transmitted through the top polarizer 52. Thus, by modulation of the electrical field applied to the liquid crystal layer 56, the amount of light transmitted though the pixel 50 may be correspondingly modulated.

Disposed over the liquid crystal layer 56 opposite from the TFT layer 58 may be one or more alignment and/or overcoating layers interfacing between the liquid crystal layer 56 and an overlying color filter 54. The color filter 54, in certain embodiments, may be a red, green, or blue filter, such that each unit pixel 50 of the LCD 34 corresponds to a primary color when light is transmitted from the light source 64 through the liquid crystal layer 56 and the color filter 54.

The color filter 54 may be surrounded by a light-opaque mask or matrix, commonly referred to as a "black mask," 55 which circumscribes the light-transmissive portion of the unit pixel 50. For example, in certain embodiments, the black mask 55 may be sized and shaped to define a light-transmissive aperture over the liquid crystal layer 56 and around the color filter 54 and to cover or mask portions of the unit pixel 50 that do not transmit light, such as the scanning line and data line driving circuitry, the TFT, and the periphery of the pixel 50. Further, in addition to defining the light-transmissive aperture, the black mask 55 may serve to prevent light transmitted through the aperture and color filter 54 from diffusing or "bleeding" into adjacent unit pixels.

In the depicted embodiment, a top substrate 51 may be further disposed over the top polarizing layer 52. In some embodiments, the top substrate 51 may be formed from light-transmissive glass, quartz, and/or plastic. Internal light, such as modulated light from the backlight 64, may be transmitted out of the pixel 50 through the top substrate 51. Furthermore, external light may also pass through the top substrate 51 and into the lower layers of the pixel 50, and reflections of the external light (e.g., reflections from the transflective layer 60) may pass through the top substrate 51 to be viewed by a user of the display 12. While using a reflective or tranflective layer 60 may increase illumination of the display 12 without substantial increases in power consumption, reflections out of the top substrate 51 may also result in decreased contrast. In particular, due to the configuration of some display devices, light may be reflected out of the top substrate 51 even when the pixel beneath the substrate 51 is in an off (i.e., black) state. Such reflections may increase the total illumination of a pixel when the pixel should be in a black state, thereby decreasing the contrast between pixels in black and white states.

Figure 5:
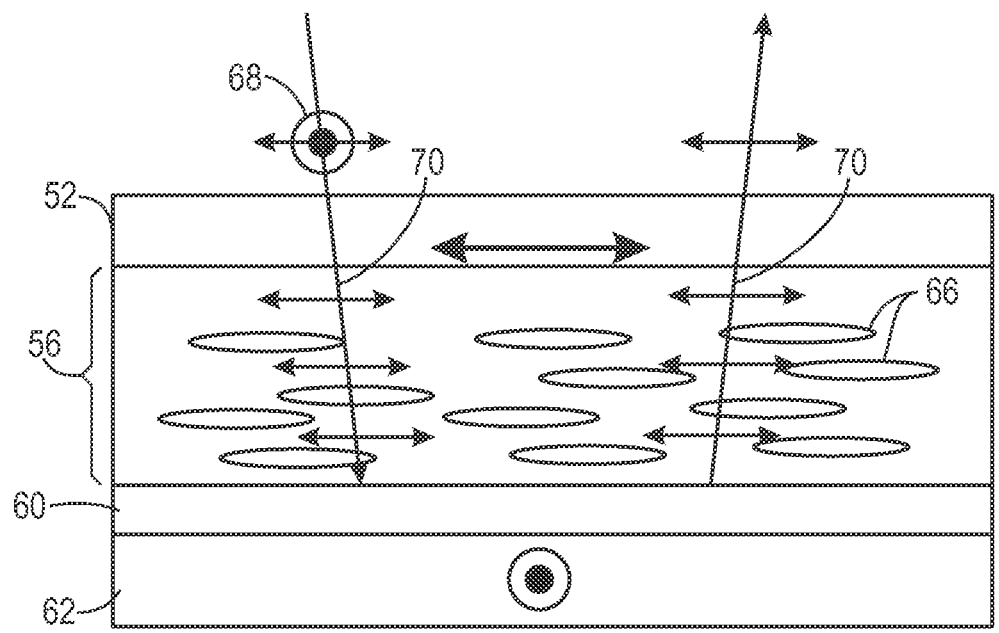
FIG. 5 is a cross-sectional side view of a light reflection from a reflective layer in a pixel in an off state in accordance with aspects of the present disclosure.
Figure 6:
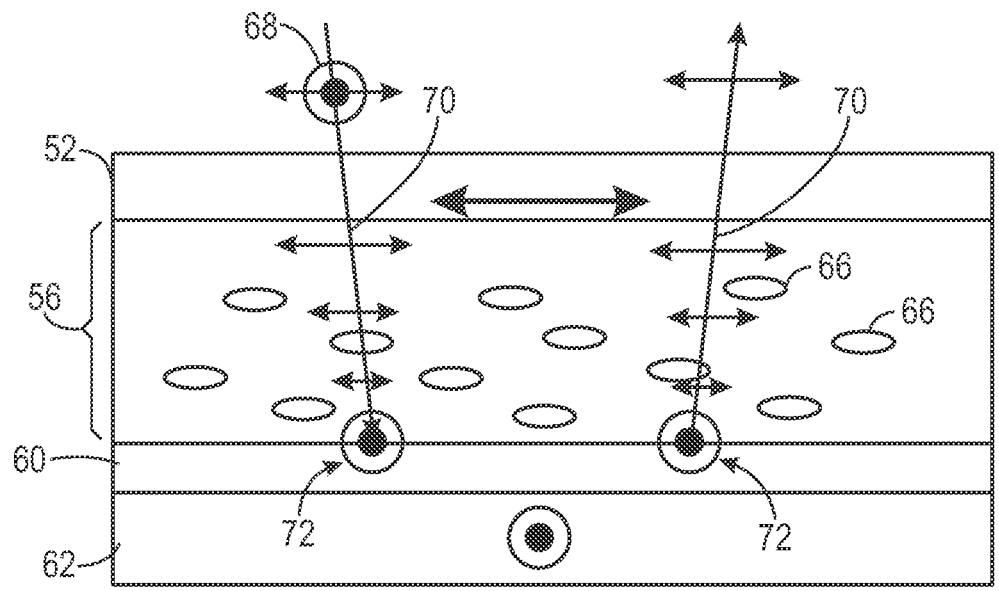
FIG. 6 is a cross-sectional side view of a light reflection from a reflective layer in a pixel in an on state in accordance with aspects of the present disclosure.

FIGS. 5 and 6 illustrate how certain pixel configurations may result in reflection of external light regardless of whether the pixel off (FIG. 5) or on (FIG. 6). The portion of the pixel in the on state illustrated in FIG. 5 includes a bottom polarizer 62, a transflective layer 60 disposed over the bottom polarizer 62, a liquid crystal layer 56 having liquid crystal molecules 66 disposed over the transflective layer 60, and a top polarizer 52 disposed over the liquid crystal layer 56. The top polarizer 62 may be beneath a top substrate 51 (illustrated in FIG. 4), through which external light 68 may be transmitted.

External light 68, which may include light from any light source external to the LCD 34 (e.g., sunlight, lamplight, etc.) and may be unpolarized, may be linearly polarized by the top polarizer 52. The top polarizer 52 may have a polarization and pass only portions of the external light 68 having the same polarization, while absorbing light not having the same polarization. As such, the light passing through from the bottom surface of top polarizer 52 may be polarized to the same polarization as the top polarizer 52, and may be referred to as p-polarized light 70. In some embodiments, the p-polarized light 70 may be polarized by the top polarizer 52 to a direction perpendicular to the direction of travel of the external light 68 as it impinges the top polarizer 52. For example, top polarizer 52 may have a polarization which is in-plane with the top surface (e.g., the top substrate 51) of the display 12.

The p-polarized light 70 may then propagate through the liquid crystal layer 56. As illustrated in FIG. 5, the pixel may be in an off state, and the liquid crystal molecules 66 of the liquid crystal layer 56 may be elongated and may not substantially alter the polarization of the p-polarized light 70. The p-polarized light may then impinge and be reflected by the transflective layer 60. The direction of the linearly p-polarized light 70 may not change in polarization after reflection from the transflective layer 60, and the reflected p-polarized light 70 may be transmitted through the top polarizer 52 (which is also p-polarized) and be viewed by a user of the display.

An illustration of light reflected from a pixel in an on state is provided in FIG. 6. External light 68 may be linearly polarized by the top polarizer 68 to p-polarized light 70 before propagating through the liquid crystal layer 56. As the pixel illustrated in FIG. 6 is on, the liquid crystal molecules 66 may be aligned to shift the polarization of the p-polarized light 70, such that the light which impinges the transflective layer 60 has a different polarization (e.g., shifted by 90 degrees), and may be referred to as s-polarized light 72. The s-polarized light 72 is reflected from the transflective layer 60. However, as the pixel is on, the liquid crystal molecules 66 again shift the polarization of the s-polarized light 72 (e.g., by another 90 degrees), such that the reflected light which reaches the top polarizer 52 is again p-polarized light 70. Since the p-polarized light 70 has the same polarization as the top polarizer 52, the p-polarized light 70 may also be transmitted through the top polarizer 52 and be viewed by a user of the display.

Therefore, in certain display configurations as illustrated in FIGS. 5 and 6, the reflective and/or transflective layer reflects substantially all light through the pixel from the top polarizer to be viewed at the display surface, regardless of whether the pixel is on or off. While the transmitted reflected light may desirable increase illumination from a pixel in an on state, such illumination from a pixel in an off state may be undesirable. More specifically, reflected light over the display surface may decrease the contrast ration between on and off pixels (e.g., pixels emitting white light and pixels which are not supposed to be emitting light, respectively), possibly decreasing the quality of displayed images.

Figure 7:
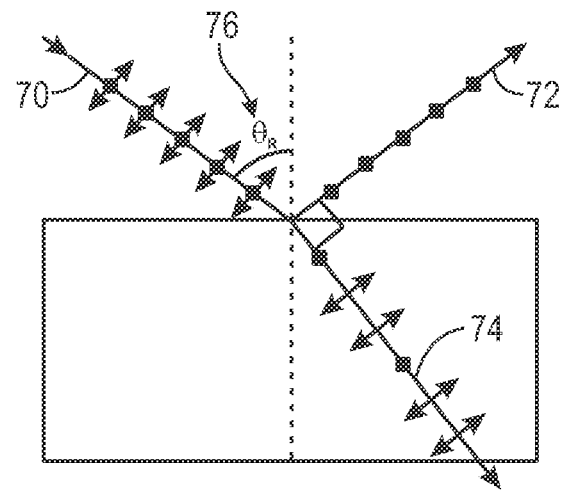
FIG. 7 is a diagram representing a path of light traveling towards a surface at approximately the Brewster's angle in accordance with aspects of the present disclosure.

In one or more embodiments, a pixel 50 may include a transflective layer 60 configured to affect the polarization of external light, such that reflected light may be transmitted when the pixel 50 is on and absorbed when the pixel 50 is off. In some embodiments, techniques may involve reflecting light incident to Brewster's angle to control the polarization of the reflected light. The diagram illustrated in FIG. 7 represents the Brewster's angle $\theta_B$ 76 as the angle of incidence at which light 70 impinges a surface, where the reflected light 72 is substantially polarized in one direction. The reflected light 72 may be substantially perpendicular to the refracted light 74, which may be slightly polarized in the same polarization as the originally impinged light 70. In accordance with the present techniques, the originally impinged light 70 may be unpolarized or polarized. For example, the originally impinged light 70 may be p-polarized, and the reflected light 72 may be s-polarized.

Figure 8:
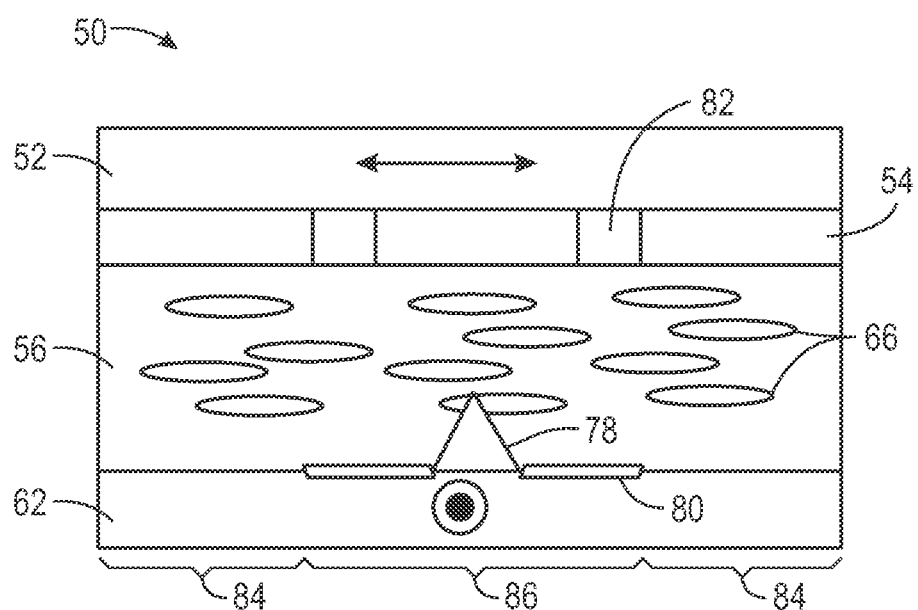
FIG. 8 is a cross-sectional side view of a pixel in the display device illustrated in FIG. 4 having a prism and a diffuse reflector in accordance with aspects of the present disclosure.

One or more embodiments utilize the concept of Brewster's angle to control the polarization of reflected light in a pixel 50. One embodiment is illustrated in FIG. 8, which is a cross-sectional side view of a portion of a pixel 50 having a top polarizer 52, a color filter layer 54 having holes 82, a liquid crystal layer 56 having liquid crystal molecules 66, a transflective layer 60 having a diffuse reflector 80 and a prism mirror 78, and a bottom polarizer 62. The color filter layer 54 may include holes 82 which may increase the amount of external light penetrating the layers of a pixel 50 to be reflected by the reflective portion 86 of the transflective layer 60. As discussed, increasing the amount of external light penetrating through the pixel 50 and reflecting off the reflective portion 86 may increase the illumination of the pixel 50. An aerial view of the color filter layer 54 is illustrated in FIG. 9. In some embodiments, the holes 82 of the color filter layer 54 may be arranged such that external light impinging the surface of a pixel may pass through the holes 82 to the diffuse reflectors 80 of the transflective layer 60.

The transflective layer 60 may be configured to affect the polarization of reflected light, such that the reflections of external light may be transmitted out of a pixel 50 or absorbed by the top polarizer 52 of the pixel 50 depending on whether the pixel 50 is on or off. As discussed, the transflective layer 60 may include a light-transmissive portion 84 and a light-reflective portion 86 over each pixel 50 in a pixel matrix of a display 12. The transmissive portion 84 may significantly transmit light from a light source within the display 12. For instance, light from a backlight 64 (FIG. 4) or from an OLED device may be transmitted through the transmissive portions 84 of the pixel 50. In some embodiments, the reflective portion 86 of the transflective layer 60 may transmit light from within the display 12 as well as reflect external light impinging a top substrate 51 (FIG. 4) of the pixel 50.

An aerial view of the transflective layer 60 over a pixel 50 in an LCD 34 is illustrated in FIG. 10, where the transmissive portion 84 may generally include a substrate 61 having holes 85 arranged along the pixel 50. The reflective portion 86 of the transflective layer 60 may also include transmissive holes 85 and may also transmit light. In addition, the reflective portion 84 may include an arrangement of diffuse reflectors 80 and prism mirrors 80 configured to affect the polarization of reflected light.

Referring again to FIG. 8, in some embodiments, the reflective portion 86 of the transflective layer 60 includes a prism mirror 78 and diffuse reflectors 80 disposed around the prism mirror 78. The diffuse reflectors 80 may include a reflective, irregular or periodic substrate (e.g., "bumpy reflector") which diffuses and/or reflects light from multiple wavelengths in a plane of incidence. In some embodiments, the diffuse reflectors 80 may be configured to diffuse and/or reflect external light or portions of external light towards the prism mirror 78.

The prism mirror 78 may include mirrors configured at an angle such that a substantial amount of the light which is diffused and/or reflected towards the prism mirror 78 by the diffuse reflectors 80 may be highly polarized in a particular polarization. In some embodiments, the angle of the mirrors in the prism mirror 78 may be angled such that when light from the diffuse reflectors 80 impinge the prism mirror 78 incident to Brewster's angle, the light may reflect off the prism mirror 78 and have an s-polarization. The prism mirror 78 and the diffuse reflectors 80 may each be disposed on the substrate 61 of the transflective layer 60 or disposed in-plane with the substrate 61.

Figure 11:
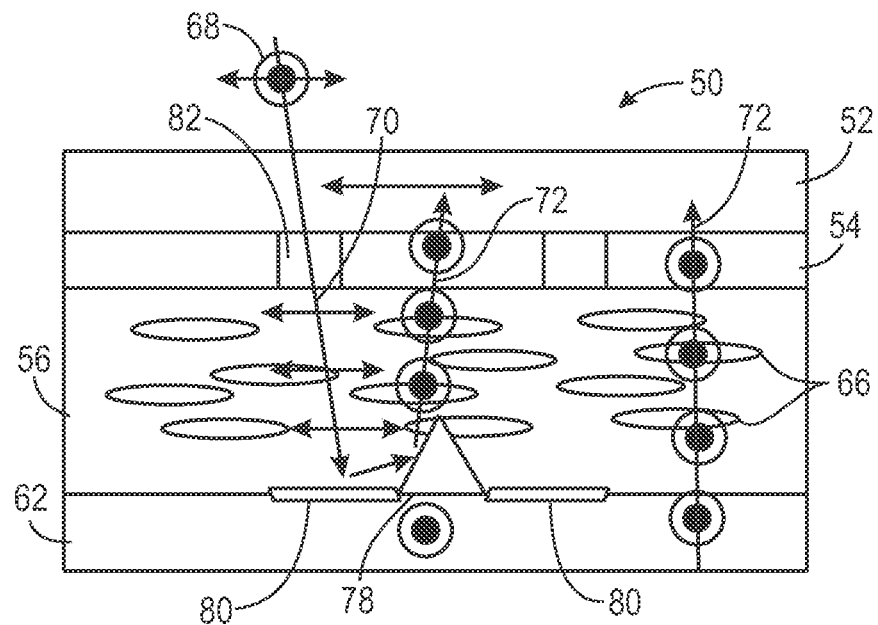
FIG. 11 is an illustration representing a path of reflected light and backlight in the cross-sectional side view of the pixel illustrated in FIG. 8, when the pixel is in an off state in accordance with aspects of the present disclosure.
Figure 12:
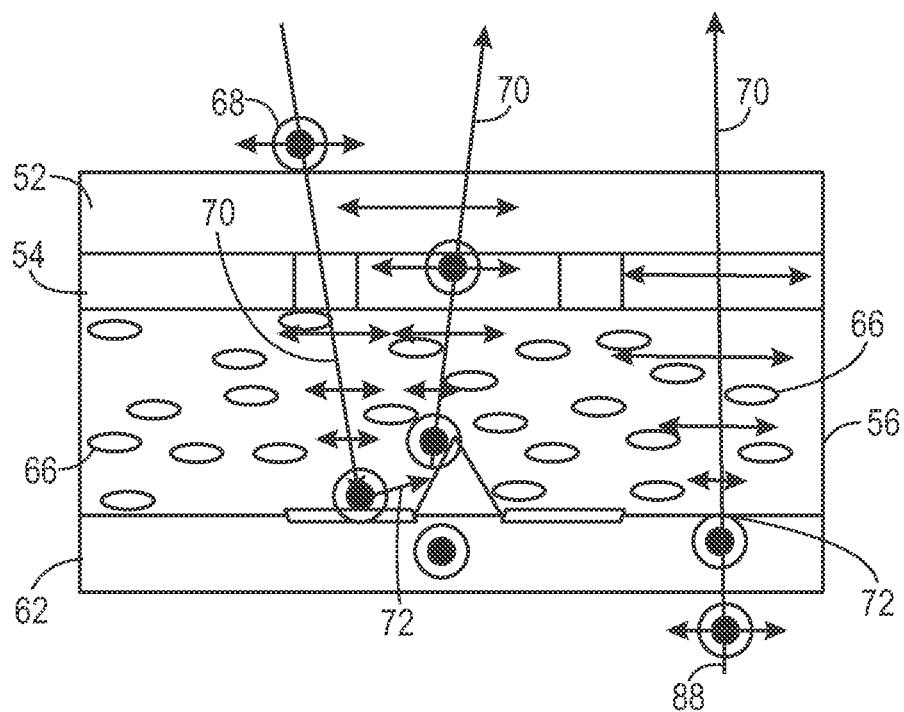
FIG. 12 is an illustration representing a path of reflected light and backlight in the cross-sectional side view of the pixel illustrated in FIG. 8, when the pixel is in an on state in accordance with aspects of the present disclosure.
Figure 13:
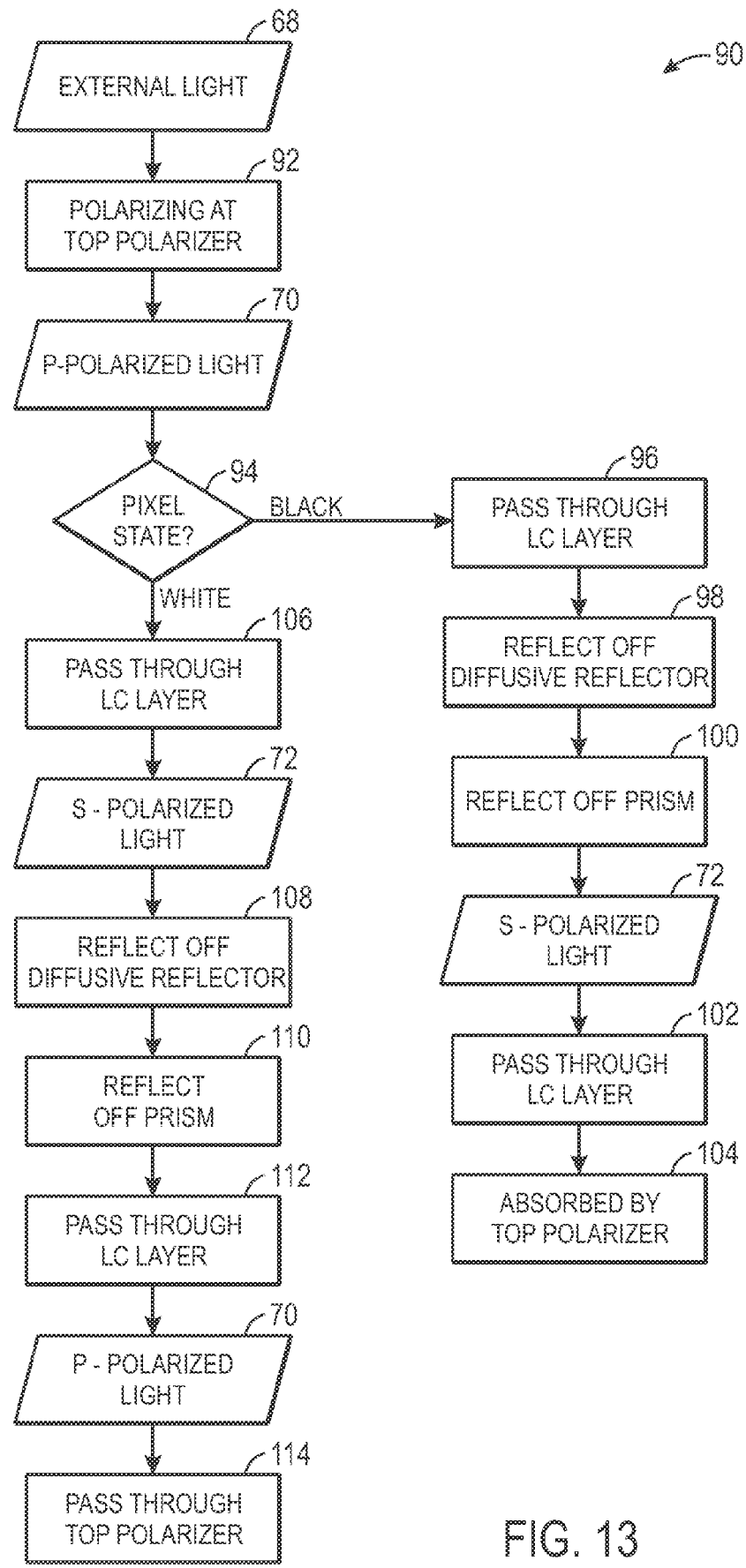
FIG. 13 is a block diagram of a process for polarizing and controlling the transmission of reflected light out of a display device in accordance with aspects of the present disclosure.

Using the diffuse reflector 80 and prism mirror 78 arrangement to polarize light in a certain polarization may result in the transmission of reflections of external light when the pixel 50 is in an on state and absorption of the reflections of external light when the pixel 50 is in an off. The transmission and absorption of light (including reflections of external light as well as internal light) are represented in FIGS. 11 and 12, where FIG. 11 represents the absorption of light when the pixel 50 is in an off state, and FIG. 12 represents the transmission of light when the pixel 50 is in an on state. Furthermore, FIG. 13 is a flow chart summarizing the path and polarization of external light as it propagates through layers of the pixel 50 in both an off state and an on state as illustrated in FIGS. 11 and 12, respectively. As such, FIGS. 11-13 will be discussed concurrently.

Beginning first with FIG. 11 which illustrates the cross-sectional side view of a pixel 50 in an off (i.e., black, deactivated) state, external light 68 may be polarized (block 92) at the top polarizer 52. In some embodiments, the external light 68 may be unpolarized, and the top polarizer 52 may be polarized in a p-polarization, which may be in a direction substantially perpendicular to the direction of travel of the external light 68. The top polarizer 52 may pass through portions of the external light 68 having the p-polarization and absorb portions of the external light 68 not having the p-polarization. Therefore, p-polarized light 70 may pass through from the bottom surface of the top polarizer 52 and through the color filter layer 54 and/or a hole 82 in the color filter layer 54, towards the liquid crystal layer 52.

The liquid crystals 66 of the liquid crystal layer 56 may be shaped differently depending on whether the pixel 50 is in an off state or an on state. As previously discussed with respect to FIG. 4, a voltage applied to a transistor in the TFT layer 58 may generate an electromagnetic field in a corresponding pixel electrode which changes the shape and/or alignment of the liquid crystal molecules of the pixel electrode. The shape and/or alignment of the liquid crystal molecules affect a polarization of light propagating through the liquid crystal layer 56. In some embodiments, controlling the polarization of light propagating through the liquid crystal layer 56 may determine whether light is absorbed or transmitted through the top polarizer 52.

For example, controlling the polarization of light propagating through the liquid crystal layer 56 may be used to control the amount of internal light 88 from a light source internal to the display 12 (e.g., backlight 64) which passes through the top polarizer 52 of a pixel 50. In some embodiments, internal light 88 is substantially transmitted through the top polarizer 52 when the pixel 50 is in an on state, and substantially absorbed by the top polarizer 52 when the pixel 50 is in an off state, as illustrated in FIG. 11. When a pixel 50 is in an off state, internal light 88 may pass through the bottom polarizer 62 of the pixel 50, the internal light 88 may be polarized according to the polarization of the bottom polarizer 62 (e.g., s-polarization). The internal light 88 may then pass through the bottom polarizer 62 as polarized light 72 and may propagate through the liquid crystal layer 56 without substantial change in polarization. When the s-polarized light 72 reaches the top polarizer 52, it may be substantially absorbed, as the s-polarized light 72 from the internal light 88 has a different polarization from the p-polarized top polarizer 52. Therefore, even if internal light 88 is still propagating through a pixel 50 in an off state, the configuration of the bottom and top polarizers 62 and the alignment of the liquid crystal molecules 66 can control the amount of internal light 88 which is emitted out of the pixel 50.

In some embodiments, depending on the state (block 94) of the pixel 50, the transmittance of reflections of external light 68 may also be controlled. When the pixel is in an off state (i.e., black state), as illustrated in FIG. 11, the liquid crystal molecules 66 may be elongated, and may not substantially polarize light which propagates through the liquid crystal layer 56. Therefore, when the pixel 50 is in an off state, the p-polarized light 70 from the external light 68 may pass (block 96) through the liquid crystal layer 56 without substantial shift in polarization.

The p-polarized light 70 may then diffuse and/or reflect (block 98) off the diffuse reflector 80 of the transflective layer 60. The diffuse reflector 80 may diffuse and/or reflect a significant portion of the p-polarized light 70 toward the prism mirror 78. In some embodiments, the prism mirror 78 may include mirrors angled to control the polarization of light reflecting off the prism mirror 78. More specifically, mirrors of the prism mirror 78 may be configured such that when light (e.g., the light reflected and/or diffused by the diffuse reflector 80) is incident at the Brewster's angle when impinged on the prism mirror 78, the reflected light is substantially polarized in an s-polarization.

As illustrated in FIG. 11, once the p-polarized light 70 reflects (block 100) off the prism mirror 78, the polarization of the p-polarized light 70 is shifted by approximately 90 degrees to become s-polarized light 72. In an off state of the pixel 50, the liquid crystal molecules 66 are not aligned to shift the polarization of light propagating through the liquid crystal layer 56, and the s-polarized light 72 may pass (block 102) through the liquid crystal layer 56 without shifting in polarization. As the top polarizer 52 has a p-polarization which transmits p-polarized light 70 while absorbing any light that is not p-polarized, the top polarizer 52 may absorb (block 104) the s-polarized light 72 while the pixel 50 is in an off state. Therefore, in some embodiments, reflections of external light 68 may be substantially absorbed by the top polarizer 82 when the pixel 50 is in an off state due to the polarization light reflected by the prism mirror 78.

A cross-sectional side view of a pixel 50 in an on (i.e., white, activated) state is provided in FIG. 12. External light 68 may be polarized by a top polarizer 52 and may propagate through the color filter layer 54 (and/or a hole 82 in the color filter layer 54) as p-polarized light 70. The p-polarized light 70 may then pass (block 106) through the liquid crystal layer 56. As illustrated in FIG. 12, the pixel 50 in an on state may have liquid crystal molecules 66 which are shaped and/or aligned to shift the polarization of light which propagates through the liquid crystal layer 56.

For example, the on state of the pixel 50 and the alignment and/or shape of the liquid crystal molecules 66 may result in the transmittance of internal light 88 out of the pixel 50. The internal light 88 may be linearly polarized by the bottom polarizer 62 to have a certain polarization (e.g., s-polarization). The s-polarized light 72 from the internal light 88 may then propagate through the liquid crystal layer 56 and may be shifted in polarization by approximately 90 degrees due to the shape and/or alignment of the liquid crystal molecules 66 while the pixel 50 is in an on state, resulting in the p-polarized light 70. Since the p-polarized light 70 has the same polarization as the p-polarized top polarizer 52, the p-polarized light 70 from the internal light 88 may substantially transmit through the layers of the pixel 50 when the pixel 50 is in an on state.

Similarly, the p-polarized light 70 from the external light 68 may also be shifted by the liquid crystal molecules 66 by approximately 90 degrees when the pixel 50 is in an on state, such that the p-polarized light 70 is polarized to s-polarized light 72. The s-polarized light 72 which reaches the diffuse reflector 80 is reflected (block 108) off the diffuse reflector 80 towards the prism mirror 78. The prism mirror 78 may be configured such that when light impinges the prism mirror 78 incident to the Brewster's angle, the reflected light may be substantially s-polarized. As the light reflected and/or diffused towards the prism mirror 78 is already s-polarized when the pixel is in an on state as illustrated in FIG. 12, the s-polarized light 72 may not substantially change in polarization as it is reflected (block 110) off the prism mirror 78 of the transflective layer 60.

The s-polarized light 72 may then propagate (block 112) through the liquid crystal layer 56. As the liquid crystal molecules 66 are aligned to shift the polarization of light propagating through the liquid crystal layer 56 while the pixel 50 is in an on state, the polarization of the s-polarized light 72 may by shifted by approximately 90 degrees, such that p-polarized light 70 propagates out of the liquid crystal layer 56. The p-polarized light 70 may have the same p-polarization as the top polarizer 52 and may be substantially transmitted (block 114) through the top polarizer 52 and out of the pixel 50 when the pixel 50 is in an on state. Therefore, in some embodiments, utilizing a transflective layer 60 having the diffuse reflectors 80 and the prism mirror 78 may control the polarization of external light 68, such that reflections of external light 68 are absorbed when the pixel 50 is in an off state, as in FIG. 11, or transmitted when the pixel 50 is in an on state, as in FIG. 12.

Figure 14:
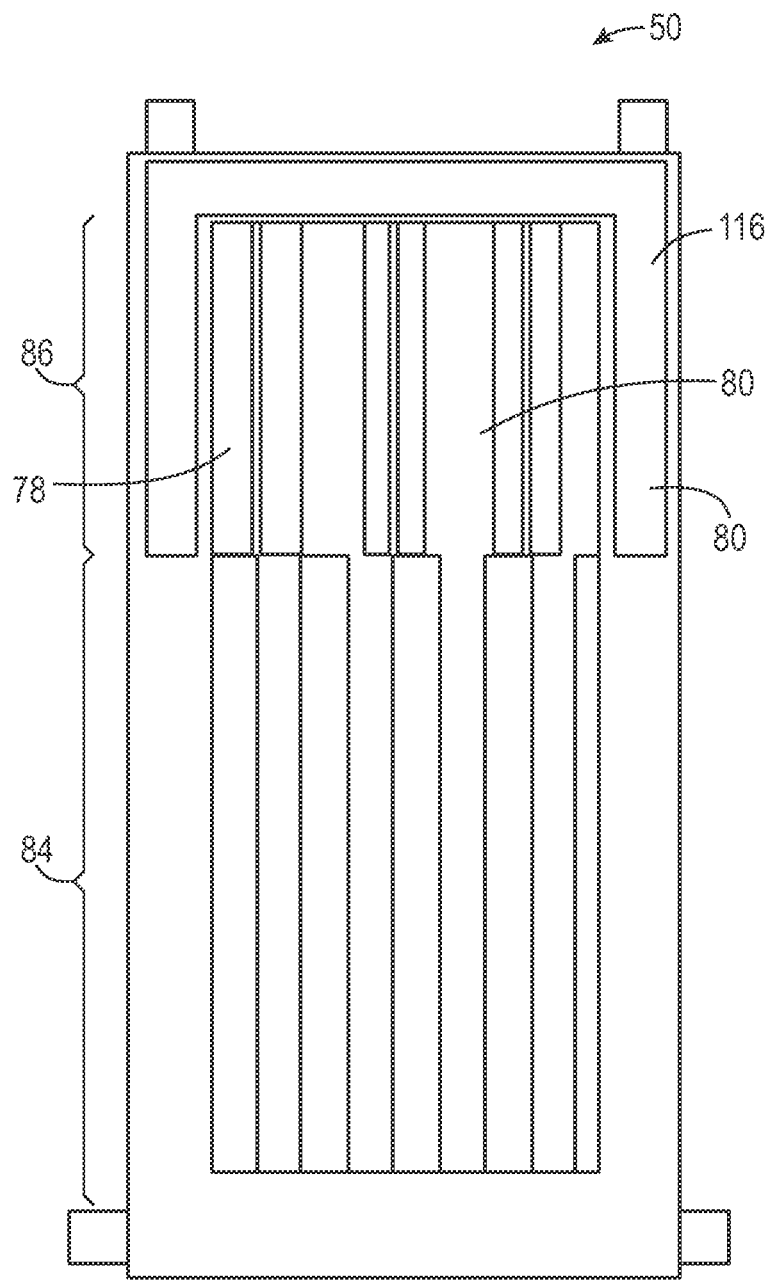
FIG. 14 is an aerial view of another embodiment of the pixel illustrated in FIG. 8 in accordance with aspects of the present disclosure.

In different embodiments, the transflective layer 60, color filter layer 54, and/or the black mask 55 may have different configurations to further increase the amount of external light which may impinge the layers of the pixel 50. By increasing the amount of external light propagating through the pixel 50, illumination from the pixel 50 may be increased when the pixel 50 in an on state. For example, as illustrated in FIG. 14, in one embodiment, a pixel 50 may include a black mask 55 disposed over the transflective layer 60, where the black mask 55 includes holes 116. More external light may pass through the holes 116 than through the black mask 55 material to further increase the amount of external light 68 propagating in the layers of the pixel 50. The transflective layer 60 may include diffuse reflectors 80 disposed under the holes 116 of the black mask 55 such that the external light 68 impinging the layers of the pixel 50 may be reflected by the diffuse reflectors 80 and/or the prism mirror 78. Therefore, pixels 50 in an on state may have increased illumination due to increased transmittance of reflected light.

Furthermore, the present techniques may include polarizing external light to different polarizations. For example, in some embodiments, the liquid crystal layer 56 may not necessarily shift the polarization of propagating light by exactly 90 degrees, and the prism mirror 78 may not necessarily reflect light to have a 90 degree shift in polarization compared to the polarization of the top polarizer 52. The top polarizer 52 is not limited to polarizing light to have a p-polarization, and the prism mirror 78 is not limited to reflecting light having an s-polarization. In some embodiments, the top polarizer 52 can polarize light at any polarization that is different from the polarization at which the prism mirror 78 reflects light.

Moreover, in some embodiments, the liquid crystal layer 56 may not necessarily shift the polarization of light when the pixel 50 is on and not shift the polarization of light when the pixel 50 is off. For example, in some embodiments, the activation of the liquid crystal molecules 66 may be reversed such that light (e.g., internal light 88 and reflections of external light 68) may be substantially shifted in polarization when the pixel 50 is off, and not substantially shifted in polarization when the pixel 50 is on.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A display device comprising:
 a plurality of pixels, wherein each pixel comprises:
 a top polarizer configured to pass light having a first polarization and absorb light not having the first polarization;
 a liquid crystal layer disposed beneath the top polarizer; and
 a transflective layer disposed beneath the liquid crystal layer,
 wherein the transflective layer comprises a prism mirror and a diffuse reflector disposed directly adjacent to the prism mirror on a common plane of the transflective layer, wherein the diffuse reflector is configured to direct light towards the prism mirror and the prism mirror is configured such that light reflected from the prism mirror has a second polarization.

2. The display device of claim 1, wherein the liquid crystal ayer comprises liquid crystal molecules configured to shift a polarization of light when a respective pixel is activated and not shift a polarization of light when the respective pixel is deactivated.

3. The display device of claim 1, wherein the liquid crystal layer is configured to shift a polarization of light having the first polarization to produce light having the second polarization while light having the first polarization propagates from the top polarizer through the liquid crystal layer and towards the transflective layer, if the pixel is activated.

4. The display device of claim 3, wherein the liquid crystal layer is configured to shift a polarization of light having the second polarization to produce light having the first polarization while light having the second polarization propagates from the prism mirror through the liquid crystal layer and towards the top polarizer, if the pixel is activated.

5. The display device of claim 1, wherein the liquid crystal layer is configured to transmit light having the first polarization without substantially changing a polarization of light having the first polarization while light having the first polarization propagates from the top polarizer through the liquid crystal layer and towards the transflective layer, if the pixel is deactivated.

6. The display device of claim 5, wherein the prism mirror is configured to change a polarization of light having the first polarization, such that light having the second polarization is reflected from the prism mirror.

7. The display device of claim 6, wherein the liquid crystal layer is configured to transmit light having the second polarization without substantially changing a polarization of light having the second polarization while light having the second polarization propagates from the prism mirror through the liquid crystal layer and towards the top polarizer, if the pixel is deactivated.

8. The display device of claim 7, wherein the top polarizer is configured to substantially absorb light having the second polarization while the light propagates to the top polarizer from the liquid crystal layer.

9. The display device of claim 1, wherein the prism mirror comprises mirrors angled such that light impinging the mirrors impinge incident to Brewster's angle.

10. The display device of claim 1, wherein the transflective layer comprises a transflective substrate configured to transmit light through the transflective substrate and reflect light from the transflective substrate, wherein the diffuse reflector and the prism mirror are disposed directly over or substantially in-plane with the transflective substrate.

11. A method of controlling a polarization of light propagating in a pixel in a display device, the method comprising:
   polarizing external light at a top polarizer of the pixel such that light polarized in a first polarization propagates from the top polarizer towards a liquid crystal layer of the pixel;
   when the pixel is in an off state, reflecting the light polarized in the first polarization off a prism mirror beneath the liquid crystal layer as light polarized in a second polarization and absorbing the light polarized in the second polarization at the top polarizer; and
   when the pixel is in an on state, shifting the polarization of the light polarized in the first polarization at the liquid crystal layer to produce light polarized in the second polarization, reflecting the light polarized in the second polarization from the prism mirror, shifting the light polarized in the second polarization reflected from the prism mirror to produce light polarized in the first polarization, and transmitting the light polarized in the first polarization out of the top polarizer of the pixel.

12. The method of claim 11, comprising reflecting the light polarized in the first polarization or the light polarized in the second polarization from a diffuse reflector disposed adjacent to the prism mirror and beneath the liquid crystal layer, towards the prism mirror.

13. The method of claim 11, comprising absorbing internal light from an internal light source at the top polarizer when the pixel is in the off state and transmitting the internal light through the top polarizer when the pixel is in the on state.

14. A transflective display device comprising a transflective layer, wherein the transflective layer comprises:
   a transflective substrate configured to transmit light through the transflective substrate and reflect light from the transflective substrate; and
   a prism mirror disposed on the transflective substrate or disposed substantially in-plane with the transflective substrate, wherein the prism mirror is configured such that light impinging the prism mirror is substantially reflected as light having an s-polarization; and
   a diffuse reflector material disposed over the transflective substrate or disposed in-plane with the transflective substrate and directly adjacent to the prism mirror, wherein the diffuse reflector material is configured to reflect light towards the prism mirror.

15. The transflective display device of claim 14, comprising:
   a liquid crystal layer disposed over the transflective layer, wherein the liquid crystal layer is configured to shift a polarization of light from the s-polarization to a p-polarization or from the p-polarization to the s-polarization when a pixel comprising the transflective layer is activated, and configured to not substantially change a polarization of light when the pixel is not activated;
   a color filter within a black mask disposed over the liquid crystal layer; and
   a top polarizer disposed over the color filter with the black mask, wherein the top polarizer is configured to transmit light having the p-polarization and absorb light not having the p-polarization.

16. The transflective display device of claim 15, wherein the color filter comprises holes, wherein external light can transmit through the top polarizer and through the color filter or through a hole in the color filter, through the liquid crystal layer, and towards reflective material in the transflective layer.

17. The transflective display device of claim 15, wherein the black mask comprises one or more holes, wherein external light can transmit through the top polarizer and through the one or more holes in the black mask, through the liquid crystal layer, and towards reflective material in the transflective layer.

18. The transflective display device of claim 15, further comprising:
   a bottom polarizer disposed beneath the transflective layer; and
   a backlight disposed beneath the bottom polarizer, wherein the backlight is configured to emit internal light towards the bottom polarizer, and wherein the bottom polarizer is configured to polarize the internal light to a s-polarization.

19. A method of controlling reflections over a pixel in a display device, the method comprising:
   reflecting light impinged on a prism mirror in a transflective layer in the pixel as light polarized in a s-polarization;
   absorbing the light polarized in s-polarization at a top polarizer of the pixel;

shifting a polarization of the light polarized in the s-polarization to produce light polarized in a p-polarization at a liquid crystal layer disposed below the top polarizer and above the transflective layer, while the light polarized in the s-polarization propagates from the prism mirror through the liquid crystal layer, and while the pixel is in an on state; and transmitting the light polarized in the p-polarization out of the top polarizer of the pixel while the pixel is in the on state.

20. The method of claim 19, comprising polarizing external light at a top polarizer of the pixel to the p-polarization, such light polarized in the p-polarization propagates from the top polarizer towards the liquid crystal layer.

21. The method of claim 20, comprising shifting a polarization of the light polarized in the p-polarization to produce light polarized in the s-polarization at the liquid crystal layer while the light polarized in the p-polarization propagates from the top polarizer through the liquid crystal layer, and while the pixel is in the on state.

* * * * *

UNITED STATES PATENT AND TRADEMARK OFFICE
CERTIFICATE OF CORRECTION

| | | |
|---|---|---|
| PATENT NO. | : 8,593,598 B2 | Page 1 of 1 |
| APPLICATION NO. | : 13/103757 | |
| DATED | : November 26, 2013 | |
| INVENTOR(S) | : Cheng Chen et al. | |

It is certified that error appears in the above-identified patent and that said Letters Patent is hereby corrected as shown below:

In the Specification

Column 12, line 67, replace "ayer" with --layer--.

Signed and Sealed this
Sixth Day of May, 2014

Michelle K. Lee
*Deputy Director of the United States Patent and Trademark Office*